United States Patent [19]
Goolsbay

[11] 3,873,294
[45] Mar. 25, 1975

[54] APPARATUS FOR TEMPERING GLASS SHEETS

[75] Inventor: Dennis M. Goolsbay, Caracas, Venezuela

[73] Assignee: PPG Industries, Inc., Pittsburgh, Pa.

[22] Filed: Nov. 27, 1973

[21] Appl. No.: 419,469

[52] U.S. Cl. .................................... 65/348, 65/114
[51] Int. Cl. .............................................. C03b 27/00
[58] Field of Search ............. 65/104, 106, 114, 348, 65/349, 350, 351

[56] References Cited
UNITED STATES PATENTS
2,876,592  3/1959  Black et al. ........................... 65/351
FOREIGN PATENTS OR APPLICATIONS
564,798  10/1958  Canada ................................. 65/348

Primary Examiner—S. Leon Bashore
Assistant Examiner—Peter F. Kratz
Attorney, Agent, or Firm—Edward I. Mates; Thomas F. Shanahan

[57] ABSTRACT

Apparatus for tempering glass sheets comprising means for moving a pair of spaced, opposing plenum chambers in unison in either a reciprocating path in a horizontal plane or in a closed orbital motion in a vertical plane while imparting tempering fluid against the opposite surfaces of a glass sheet supported in the space between the opposing plenum chambers through nozzles extending from the plenum chambers.

3 Claims, 4 Drawing Figures

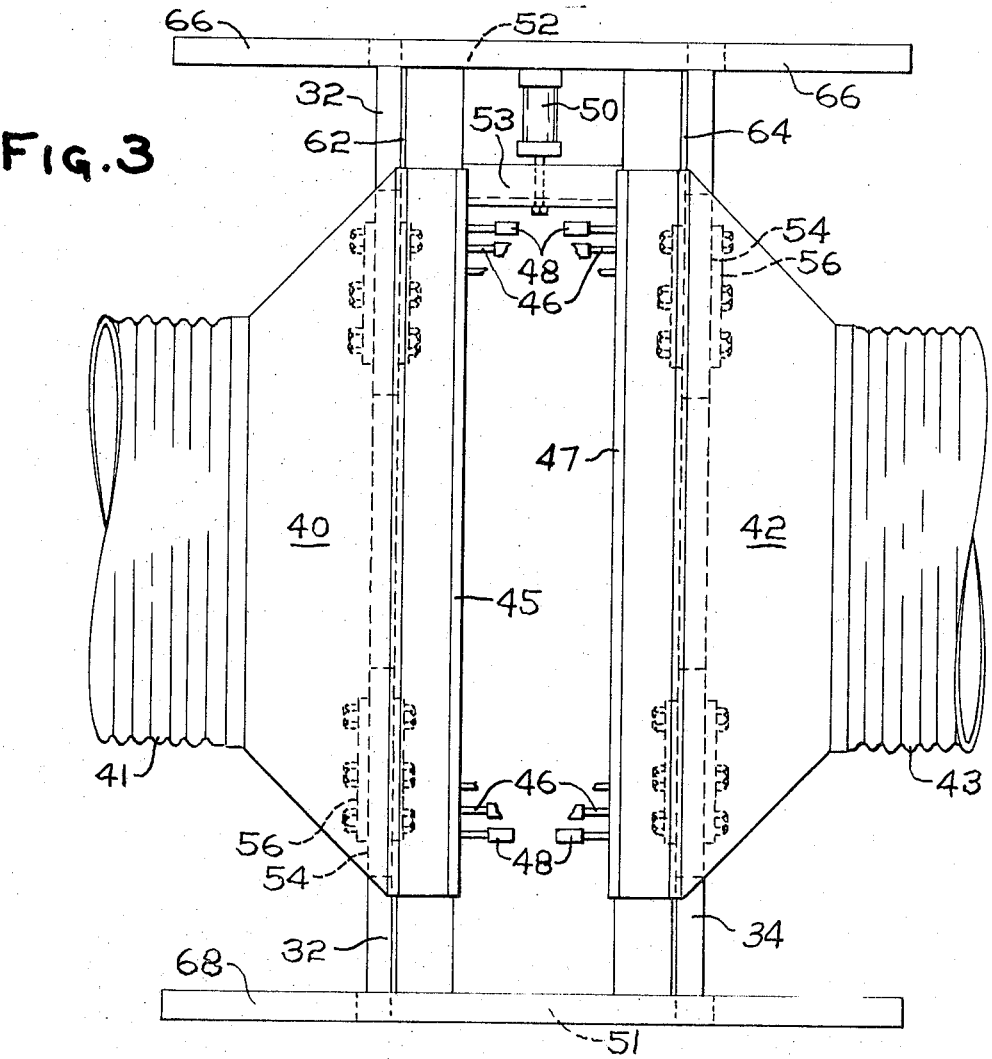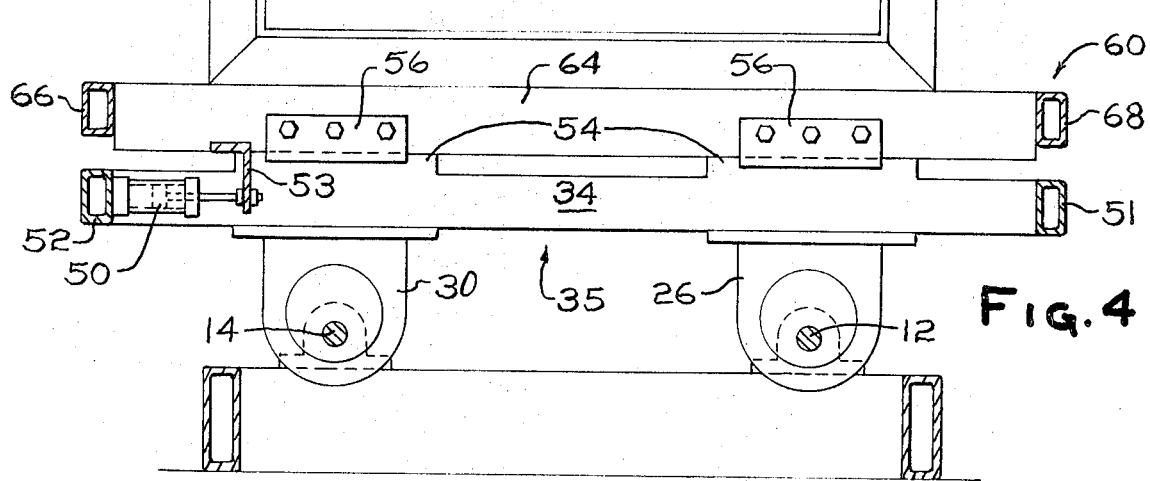

APPARATUS FOR TEMPERING GLASS SHEETS

BACKGROUND OF THE INVENTION

This invention relates to apparatus for tempering flat or curved glass sheets and, more specifically, apparatus that imparts a more uniform temper to glass sheets of various configurations.

The basic process for tempering glass is well known. A glass sheet is heated above its annealing range and its surfaces are chilled rapidly to below the strain point while the interior is still hot. Rapid chilling continues until the entire glass sheet cools to below its strain point. This rapid cooling causes the glass sheet to develop a thin skin of compression stress surrounding an interior stressed in tension. Such a stress distribution makes the glass sheet much stronger than untempered glass so that tempered glass is less likely to shatter than untempered glass when struck by an object. Furthermore, in the less frequent times when an outside force is sufficiently large to cause tempered glass to fracture, tempered glass breaks up into a large number of smoothly surfaced, relatively small particles which are far less dangerous than the larger pieces with jagged edges that result from the fracture of untempered glass.

Typical prior art tempering apparatus include nozzles extending from plenum chambers to direct a plurality of air blasts against the opposite sides of a glass sheet. The prior art provides means to impart movement to the nozzles in unison relative to the glass surface so that the air blasts are not directed against fixed locations on the glass to cool the latter rapidly while other locations adjacent the fixed locations are not cooled as rapidly. Without such relative movement, patterns of iridescence form on the surface of the tempered glass. These patterns of iridescence are very annoying when viewed in reflection.

The glass tempering art has developed many techniques for imparting relative motion between the array of nozzles and the glass to avoid iridescent patterns. Some of these involve linear reciprocation of the nozzles. Others involve linear movement of glass sheets past an array of fixed nozzles. Others involve applying orbital movement (elliptical or circular) of nozzles relative to a glass sheet supported at a fixed position.

The shape of the glass sheet to be tempered and its manner of support between plenum chambers determines the best technique for providing relative movement between the nozzle arrays extending from the plenum chambers and the glass sheet to be tempered. For example, when vertically supported glass sheets are oriented with a sharp bend extending in a horizontal direction, it is best to reciprocate the nozzle arrays along an axis parallel or approximately parallel to the given direction. When a flat glass sheet or a gently curved sheet of shallow curvature is tempered, it is usually most convenient to quench glass with nozzles to which are imparted curcular orbital movements that overlap corresponding movement of adjacent nozzles.

It is usually possible to suspend shaped glass sheets in tempering apparatus in such a manner that their axes of bending extend horizontally. Such sheets are readily tempered by reciprocating the quenching nozzles in a horizontal direction. Therefore, it would be beneficial to the glass tempering art to provide glass tempering apparatus that is capable of rapid adjustment between a circular orbital motion and horizontal reciprocation for the nozzles in unison.

DESCRIPTION OF THE PRIOR ART

U.S. Pat. No. 2,724,215 to Gilstrap shows apparatus for reciprocating in unison a pair of plenum chambers in a vertical direction. This patent also suggests the possibility of reciprocating the plenum chambers in a horizontal direction.

U.S. Pat. No. 2,876,592 to Black and Moorhead and U.S. Pat. No. 2,876,593 to Neuhausen suggest imparting circular orbital motions to two sets of spaced opposing nozzles by simultaneously applying two mutually perpendicular reciprocations 90° out of phase with one another.

U.S. Pat. No. 3,294,519 to Fickes imparts a horizontal linear reciprocation to two sets of spaced curved nozzles disposed on opposite sides of a curved glass sheet to be tempered.

U.S. Pat. No. 3,595,636 to Posney discloses means to simultaneously reciprocate a pair of plenum chambers along a vertical axis of reciprocation relative to the opposite surfaces of a glass sheet suspended by tongs between the plenum chambers.

U.S. patent application Ser. No. 299,970 of Antonio Luppino filed Oct. 24, 1972 discloses and claims apparatus capable of horizontal or vertical reciprocation of all of the nozzles in unison and in addition the ability to impart circular orbital motion to all of the nozzles in unison. However, even though the apparatus of the Luppino patent application may be readily modified from one of the nozzle movements possible to another of the possible nozzle movements, it is necessary to discontinue operations while a change is being made. The glass tempering art was still in need of apparatus that still further reduces loss of production time when production is changed from pattern to pattern of such a nature that the nozzle arrays must be moved in a circular orbital motion rather than a linear reciprocation or vice versa.

SUMMARY OF THE PRESENT INVENTION

The present invention provides apparatus for cooling glass sheets comprising a pair of plenum chambers, each having an inward facing apertured wall facing a similar inward facing apertured wall of the other plenum chamber in spaced relation thereto, means for supporting a glass sheet between said apertured walls and means for imparting tempering medium under pressure to said plenum chambers for delivery through said apertured walls against the opposite surfaces of a heated glass sheet located between said apertured walls with novel structure that facilitates rapid change in motion of the orbital arrays. In this this novel structure, the plenum chambers are interconnected by an upper frame or skeleton structure for movement in usison along a first axis. The upper frame or skeleton structure is mounted on lower frame or skeleton structure. Reciprocating movement means is provided to selectively reciprocate said upper frame and its interconnected plenum chambers relative to said lower frame to provide said plenum chambers in unison with a reciprocating motion. Cam means actuated by a motor drive is connected to the lower frame to move both frames in a closed orbital path in the plane defined by said cam means. The present invention provides two independently operable motion actuating means and preferably only one motion actuating means or the other operates at any given time depending on whether the pattern of glass sheets being quenched can be chilled more efficiently by closed circular orbital motion or by reciprocating linear motion of the nozzle arrays.

BRIEF DESCRIPTION OF THE DRAWINGS

In the drawings which form part of a description of an illustrative preferred embodiment of the present invention and where like reference numbers refer to like structural elements.

FIG. 3 is a fragmentary plan view showing reciprocating imparting means for moving said upper frame structure and its attached plenum chambers; and FIG. 4 is a fragmentary elevational view showing the relation of the circular orbit imparting means of FIG. 2 to the reciprocating imparting means of FIG. 3 and taken along the lines 4—4 of FIG. 2, and including a portion of the structure included in FIG. 1 as it relates to the structure illustrated in FIG. 2.

DESCRIPTION OF A PREFERRED EMBODIMENT

Figure 1:
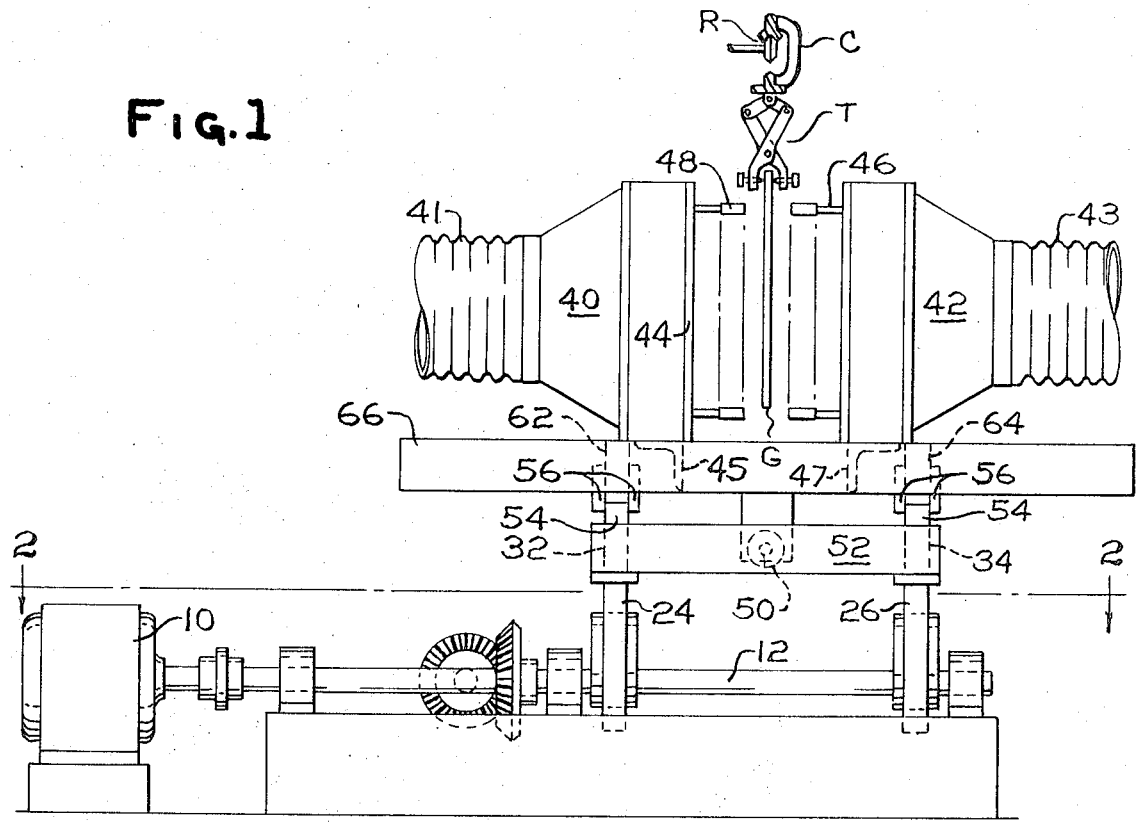
FIG. 1 is an end view partly in section, of an illustrative embodiment of the present invention, with certain parts broken away to show other parts more clearly.
Figure 2:
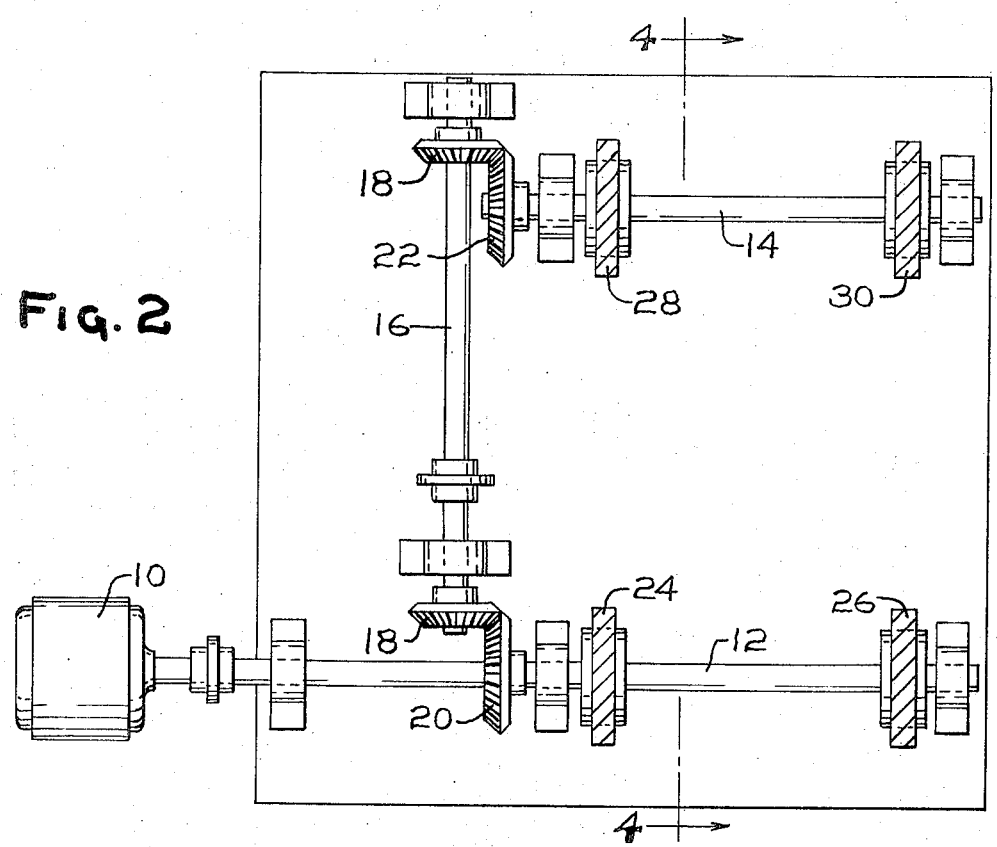
FIG. 2 is a plan view taken along lines 2—2 at right angles to the view of FIG. 1 and partly in section to illustrate circular orbital motion imparting means forming part of the present invention.

Referring to the drawings, a drive motor 10 operates a main drive shaft 12 and an auxiliary drive shaft 14 through an arrangement comprising an interconnecting shaft 16 bevel gears 18 carried by interconnecting shaft 16, bevel gear 20 rotatably mounted on drive shaft 12 and bevel gear 22 rotatably mounted on auxiliary drive shaft 14. A pair of eccentrics 24 and 26 are carried by main drive shaft 12 while eccentrics 28 and 30 are carried by auxiliary drive shaft 14. Eccentrics 24 and 28 are connected to a horizontal longitudinal member 32 and eccentrics 26 and 30 are connected to a horizontal longitudinal member 34. Cross members 51 and 52 interconnect corresponding ends of horizontal longitudinal members 32 and 34 to comprise a lower frame or skeleton structure 35. The eccentrics connecting skeleton structure 35 to the drive motor 10 cause the skeleton structure 35 to move in a closed circular orbital path when actuated by drive motor 10.

A plenum chamber 40 is rigidly mounted to one side of skeleton structure 35 and an opposing plenum chamber 42 is rigidly mounted to the other side of skeleton structure 35. Thus, the plenum chambers 40 and 42 move in closed circular orbital patterns.

The pair of plenum chambers 40 and 42 is connected through flexible conduits 41 and 43, respectively, to a conventional blowing means (not shown). An apertured wall 44 is provided at the opposing inner ends of each plenum chamber. Each aperture in the apertured wall supports an elongated nozzle 46.

Flexible nozzle extensions 48 are provided where needed to form a pair of spaced discontinuous shaped surfaces conforming to the shape of glass sheets undergoing treatment. To accomplish this, nozzle extensions 48 of different lengths are attached over the free ends of different nozzles 46 to provide spaced arrays of the ends of the flexible nozzle extensions 48 that conforms to any shaped desired. The nozzles 46 are preferably of tubular metal and the nozzle extensions 48 of synthetic silicone rubber or spring metal or the like. The free inner ends of the nozzle extensions 48 terminate at equal distances from the positions occupied by the portions of a glass sheet that they face.

A glass sheet G is shown suspended by one or more pairs of tongs T of the self-closing type. A carriage C that rides on a series of rotatable rolls R of a roller conveyor is used to support the tongs 24. Any conventional type of tong may be used to grip the glass sheets 22 near their upper edge. However, it is preferred to use tongs of the type shown in U.S. Pat. No. 2,991,114 to Lee R. Robinson which are provided with stops that engage the upper edge of the glass so that the glass gripping elements of the tongs engage the major surfaces of the glass at a definite, predetermined distance from the upper edge that is neither too close to the upper edge nor too far from the upper edge.

Each plenum chamber 40 and 42 is reinforced by an intermediate cross-bracing member 45 and 47, respectively, and both are reinforced by an upper horizontally extending members 62 and 64 rigidly connected by end members 66 and 68 at their corresponding ends.

A horizontal piston 50 is secured to cross member 52 and has its rod connected to an angled member 53. The latter is connected at its lateral ends to the upper horizontally extending members 62 and 64 of the skeleton structure 60.

Each of the horizontal longitudinal members 32 and 34 of the lower frame structure 35 is provided with a pair of horizontally extending guides 54 that slidably support a corresponding pair of brass sliding members 56 attached to respective horizontally extending members 62 and 64 of the sleketon structure 60. Thus, whenever piston 50 is actuated to reciprocate, it causes the brass sliding members 56 to slide back and forth over the respective horizontally extending guides 54, thus imparting a reciprocating motion to skeleton structure 60 and its supported plenum chambers 40 and 42 and their attached nozzles 46. Thus, blasts of air moving through arrays of nozzles 46 toward the opposite surfaces of a glass sheet G are played over the opposite major surfaces of the glass sheet in overlapping reciprocating patterns.

When air is applied under pressure to the plenum chambers for discharge through the arrays of nozzles against the opposite surfaces of a glass sheet supported between said nozzle arrays, the relative movement imparted to the nozzles causes the air blasts to be directed through the nozzles toward the opposite glass sheet surfaces over relatively moving areas of the glass that overlap one another so as to cause the glass to be cooled more uniformly. At the same time, the spaces between adjacent nozzles provides room for removing air blasts that are warmed by the glass cooling step.

As stated previously, it is necessary to impart relative motion between the arrays of nozzles and the glass sheet in order to avoid establishing an iridescence pattern in the glass resulting from non-uniformily chilling the glass. The present invention provides either horizontal linear reciprocation for the upper frame-like skeleton structure 60 and its supported plenum chambers 40 and 42 through movement inparted by piston 50 with drive motor 10 not operating or provides movement for nozzles 46 in closed circular orbit patterns that overlap one another whenever piston 50 is not activated and drive motor 10 is actuated to move both the lower frame structure 35 and the upper frame-like skeleton structure in unison through the array of drive shafts, bevel gears and eccentrics described previously.

One main advantage of the present invention is the ease by which the arrays of nozzles can have their movement rapidly changed from one in which they are reciprocated linearly in the horizontal direction or in a closed orbital motion in vertical planes generally parallel to the vertical plane of support for the glass sheet or vice versa. The present invention accomplishes a linear reciprocation by actuating only piston 50 and changes to closed orbital motion by actuating only drive motor 10. It is an easy matter to actuate one of the piston or drive motor and deactivate the other.

A typical program of operation for the above-identified apparatus is as follows: As a glass sheet G (supported by tongs T suspended from a carriage C) reaches the temperature needed for tempering, it is transferred from a furnace (not shown) by moving the carriage C along conveyor rolls R to a position between the plenum chambers 40 and 42. The blowers are actuated to start delivering air under pressure to plenum chambers 40 and 42 for exhaust as air blasts through nozzles 46 against the opposite surfaces of the glass sheet. The main drive shaft 10 or the reciprocating piston 50 operates continuously throughout the operation to avoid any inertia problems brought about by the fact that the plenum chambers and the skeleton supporting structures have too great a mass to start and stop movement intermittently. Therefore, air is blasted in moving patterns relative to the glass sheet G supported therebetween for sufficient time to impart the desired temper in the glass.

A timer actuated by a limit switch that initiates the air blasts times out to shut off the blower that supplies pressurized air to the moving plenum chambers, and the conveyor rolls R are actuated to transfer the carriage C to a subsequent treating station which may be an unloading station. The cooling or quenching station is now condition to receive the next glass sheet to be processed.

The description of the preferred illustrative embodiment has been for the purpose of illustration rather than limitation. It is understood that various changes may be made without departing from the gist of the invention as defined in the claimed subject matter that follows.

I claim:

1. Appparatus for cooling glass sheets comprising a first means for supporting a pair of plenum chambers in spaced relation to one another for horizontal reciprocation thereof, each plenum chamber having an inward facing, vertical, apertured wall facing an inward facing, vertical, apertured wall of said other plenum chamber, means for supporting a glass sheet between said apertured walls in a vertical plane, means for imparting tempering medium under pressure to said plenum chambers for delivery through said apertured walls against the opposite surfaces of a heated glass sheet located between said apertured walls, a second means for supporting said first supporting means, means for imparting reciprocating motion to said first supporting means and its supported plenum chambers in unison relative to said second supporting means, and means for imparting vertical orbital motion to said second supporting means, said first supporting means and its supported plenum chambers in unison, said means for imparting reciprocating motion being operable independently of said means to impart vertical orbital motion, whereby when said reciprocating motion imparting means is selectively actuated, said plenum chambers reciprocate in unison and, when said means for imparting vertical orbital motion is selectively actuated, said plenum chabers are moved in unison in closed orbital paths.

2. Apparatus as in claim 1, wherein said glass sheets are bent about a sharp axis of bending, a nozzle extends horizontally from each aperture of each apertured, vertical wall and terminates in a free end spaced from a free end of a corresponding nozzle extending from said other wall and extensions having different lengths are fitted over the free ends of said nozzles to provide discontinuous curved surfaces at the free ends of said extensions parallel to the shape of the glass sheet so supported.

3. Apparatus as in claim 1, wherein said first supporting means and said second supporting means each comprises a skeleton structure, means for slidably supporting said skeleton structure of said first supporting means on the skeleton structure of said second supporting means, and said means for imparting reciprocating motion to said first supporting means is interconnected between said skeleton structure of said first supporting means and said skeleton structure of said second supporting means.

* * * * *